July 6, 1954  E. W. STACEY  2,682,674
SOLE FITTING MACHINE
Filed May 7, 1952  13 Sheets-Sheet 1

Inventor
Ernest W. Stacey
By his Attorney

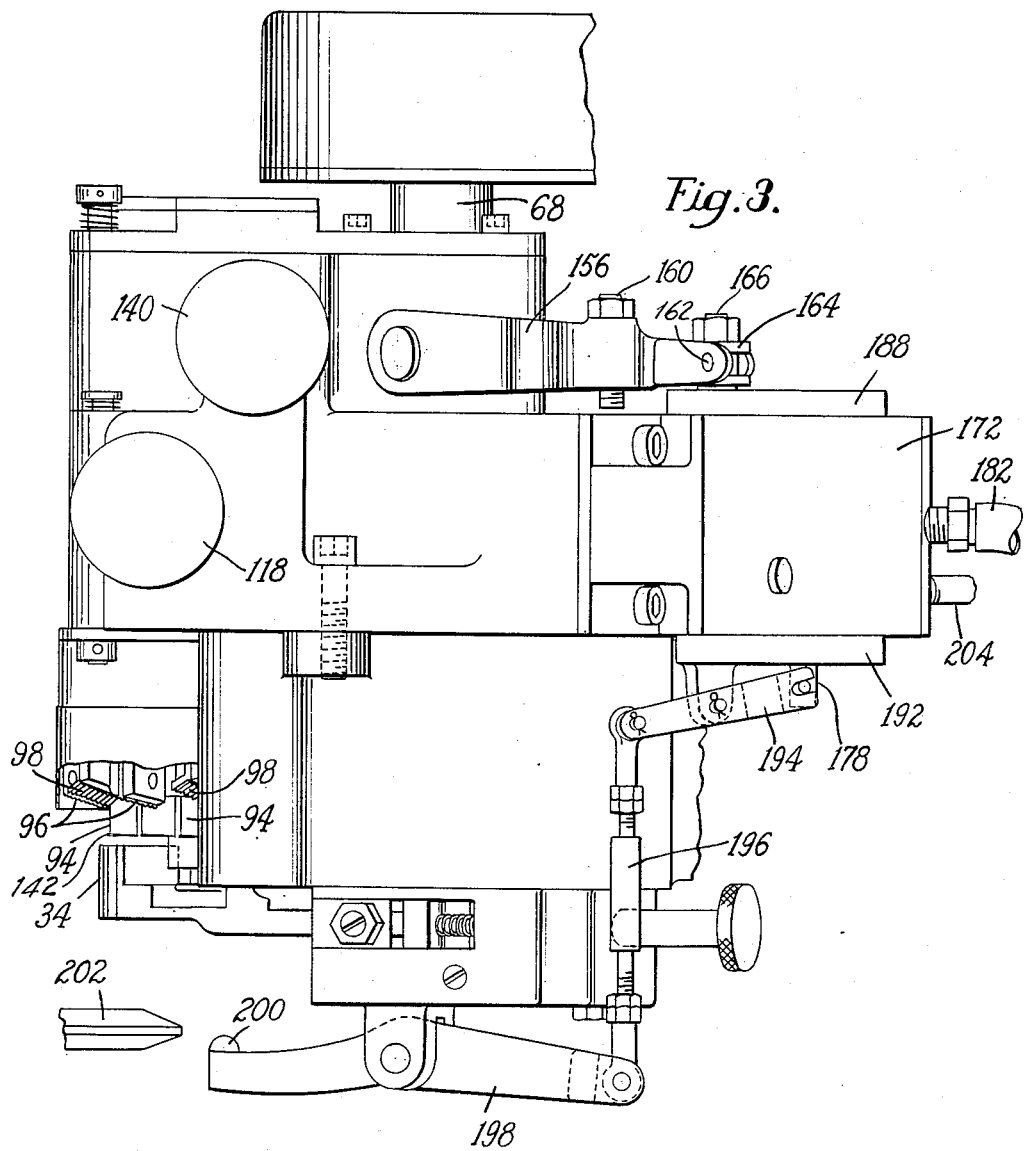

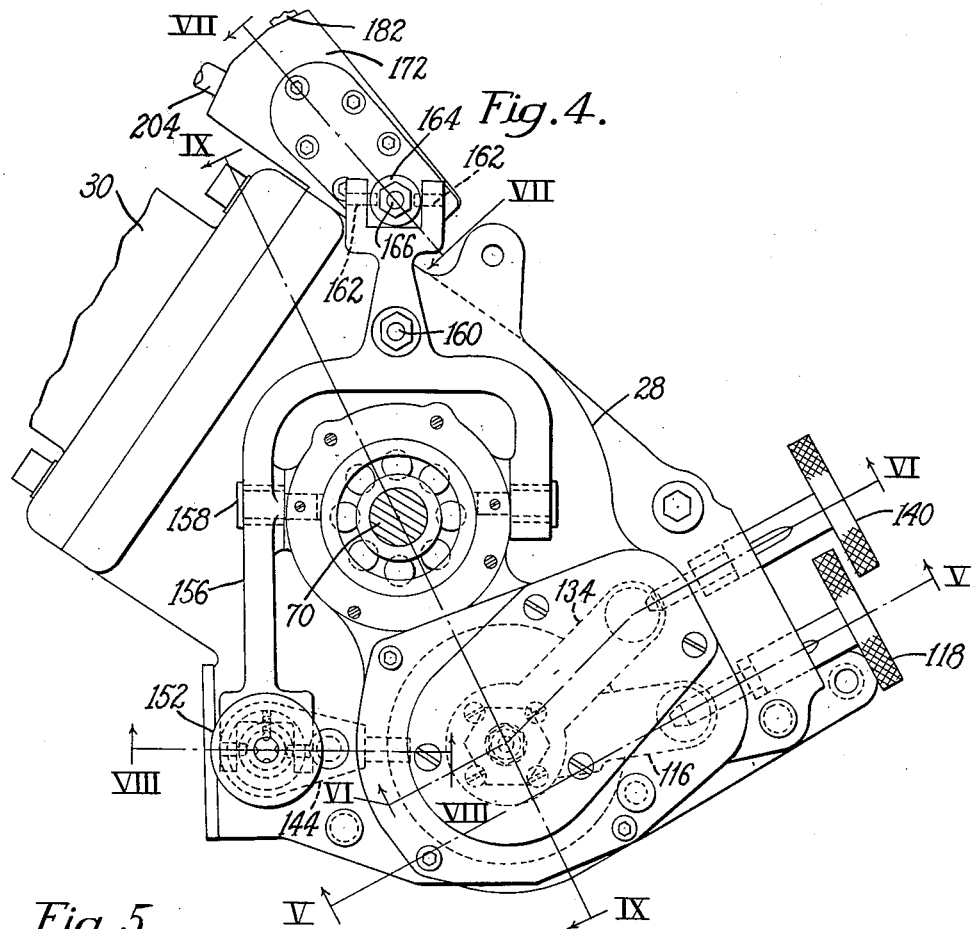
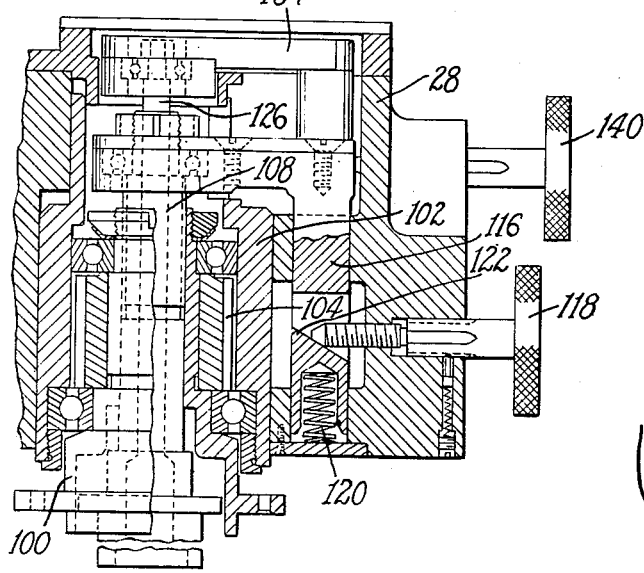

July 6, 1954     E. W. STACEY     2,682,674
SOLE FITTING MACHINE
Filed May 7, 1952     13 Sheets-Sheet 5
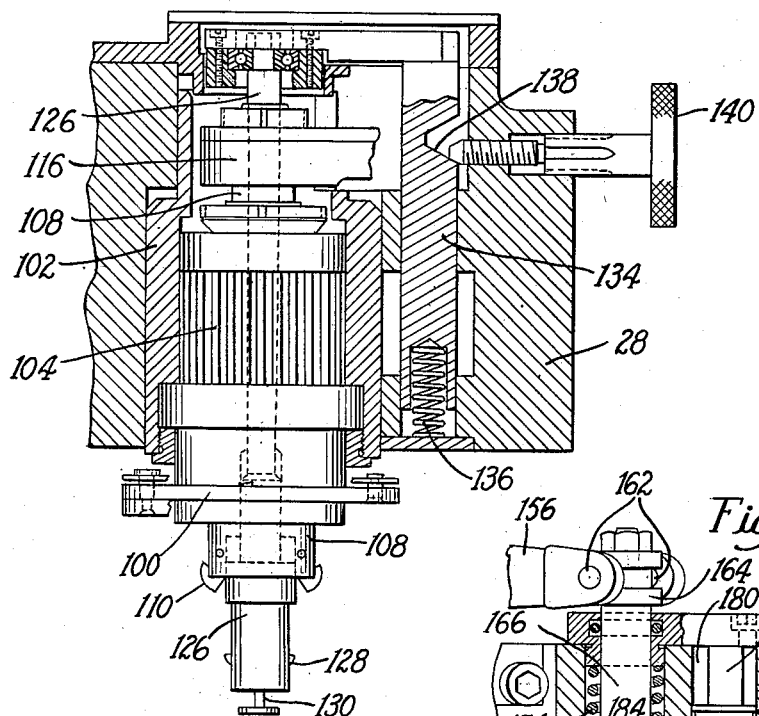
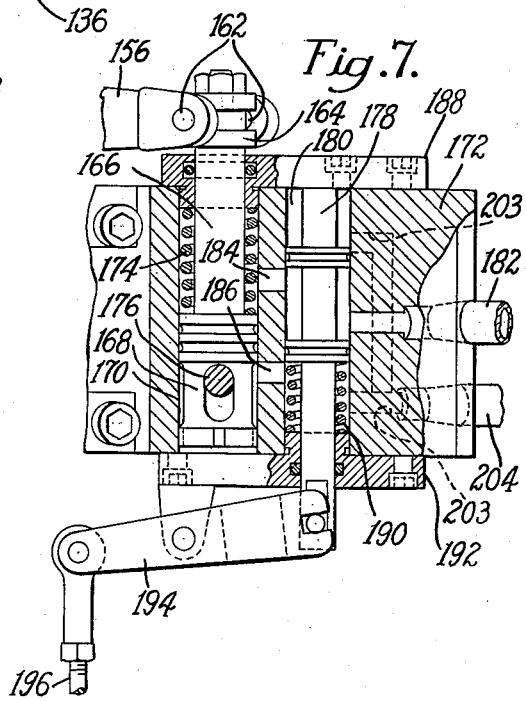
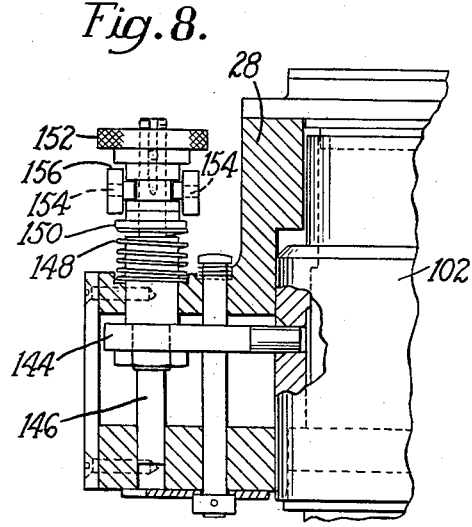
Inventor
Ernest W. Stacey
By his Attorney

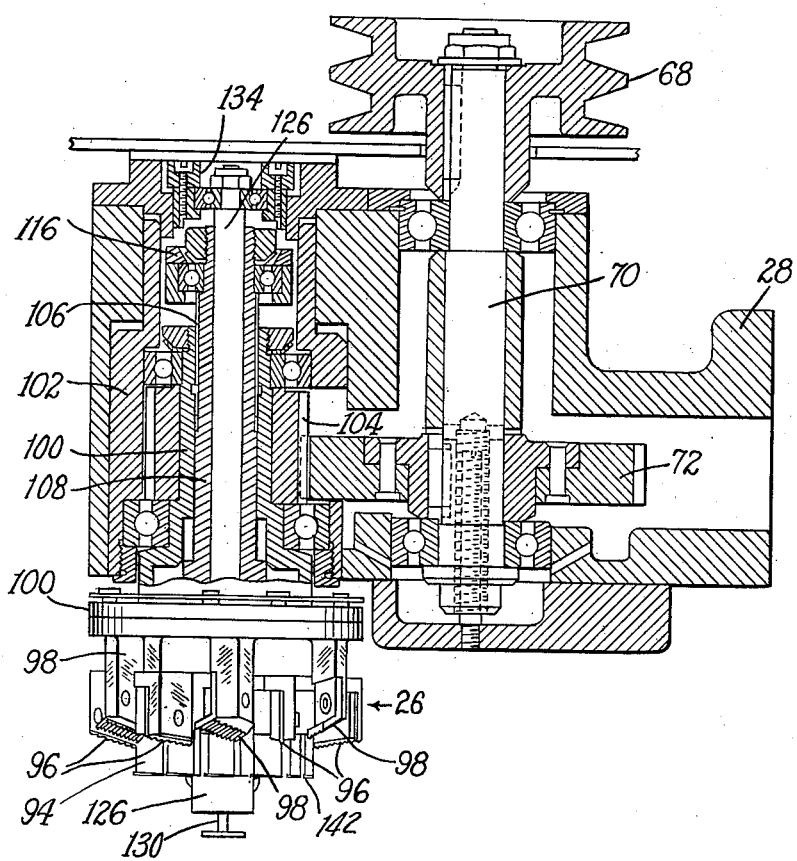
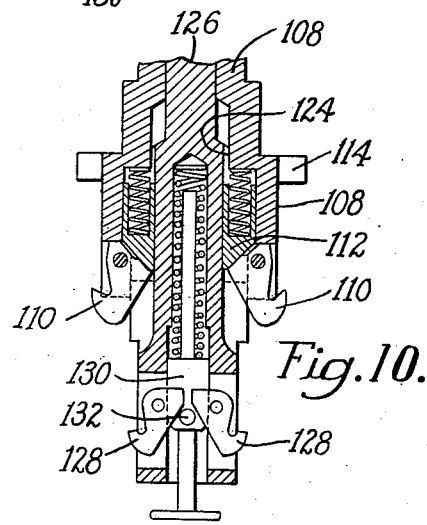
Fig. 9.
Fig. 10.
Inventor
Ernest W. Stacey
By his Attorney

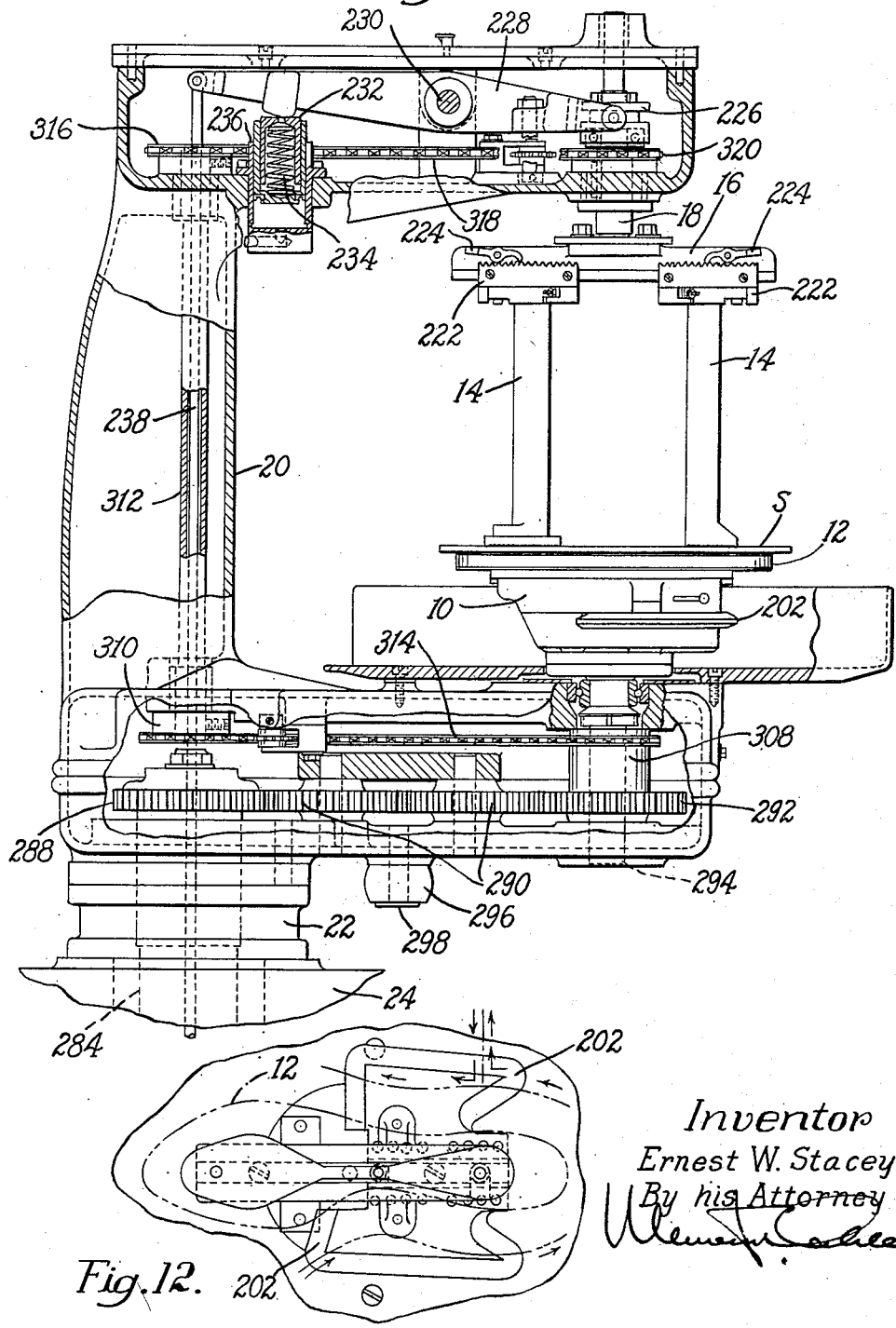

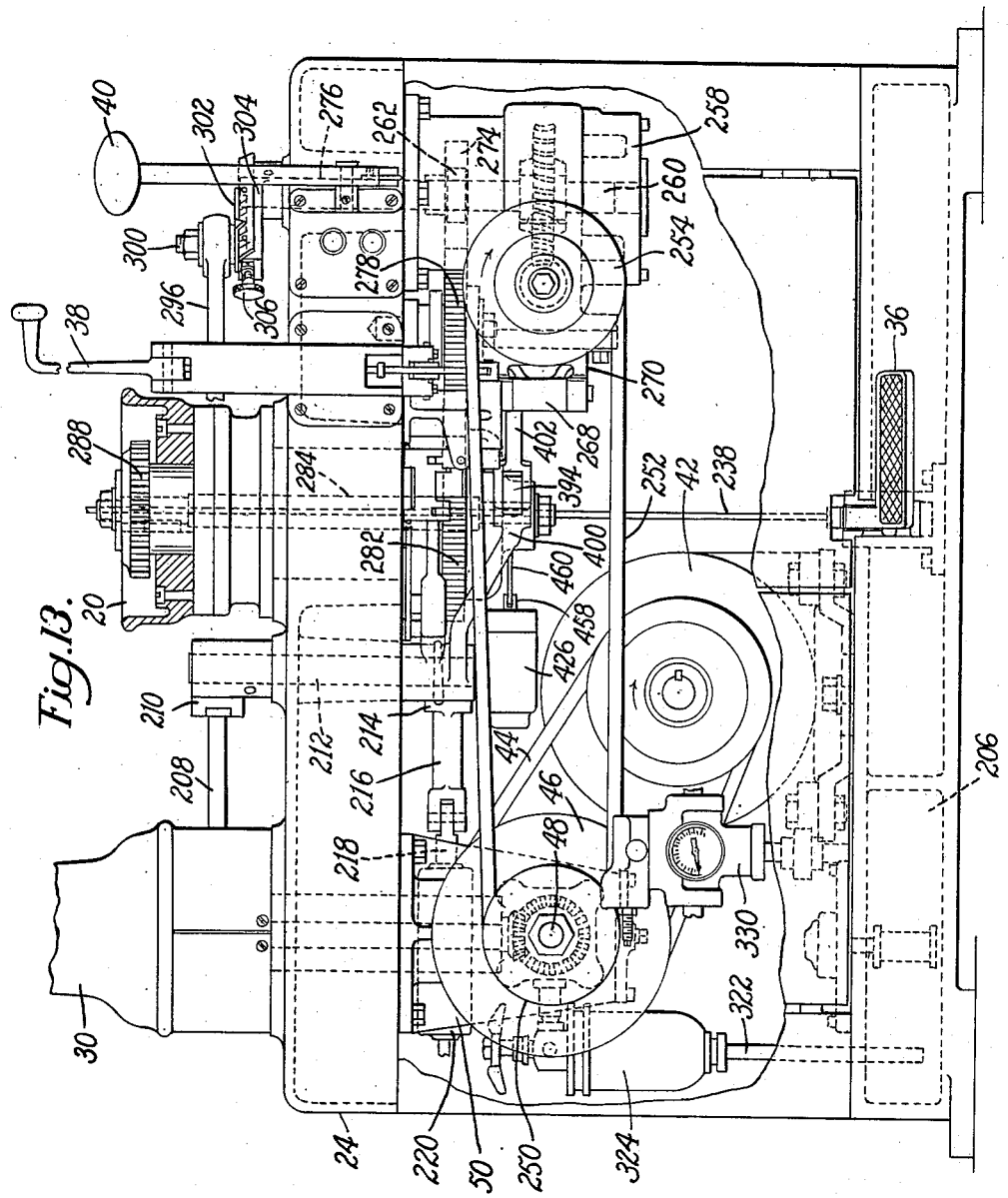

Inventor
Ernest W. Stacey
By his Attorney

Inventor
Ernest W. Stacey
By his Attorney

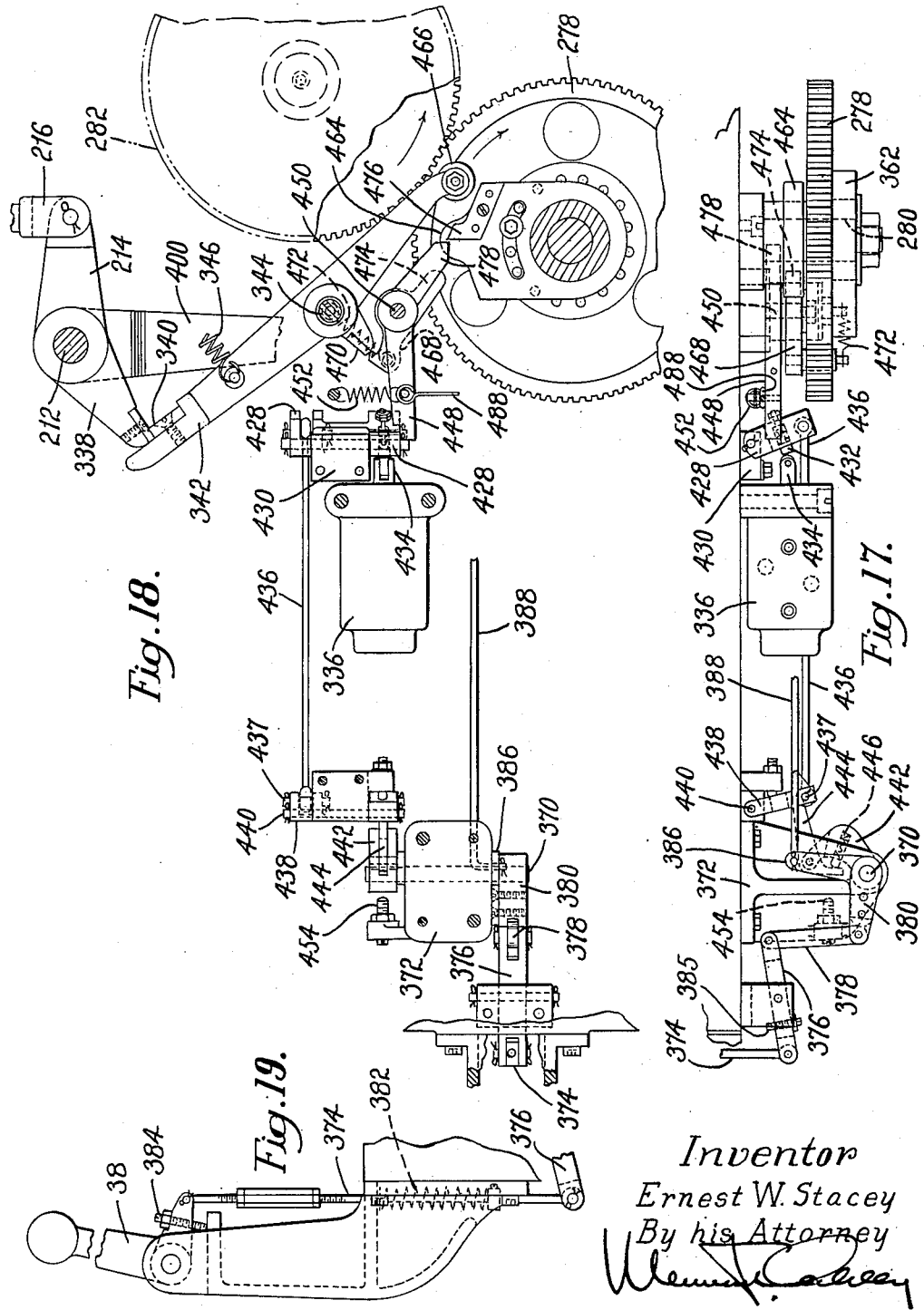

July 6, 1954

E. W. STACEY 2,682,674

SOLE FITTING MACHINE

Filed May 7, 1952

Inventor
Ernest W. Stacey
By his Attorney

*Inventor*
Ernest W. Stacey
By his Attorney

Patented July 6, 1954

2,682,674

UNITED STATES PATENT OFFICE 2,682,674

SOLE FITTING MACHINE

Ernest W. Stacey, Beverly, Mass., assignor to United Shoe Machinery Corporation, Flemington, N. J., a corporation of New Jersey Application May 7, 1952, Serial No. 286,525

8 Claims. (Cl. 12—85.1)

This invention relates to sole fitting machines and is illustrated as embodied in a machine of the type disclosed in United States Letters Patent No. 2,498,771, granted February 28, 1950 upon an application filed in my name.

The operations performed by this type of machine consist of simultaneously trimming the edge of a sole to the desired contour, beveling and roughing the margin of the sole entirely around it at one side in order to bring the edge of the sole to the desired width and to prepare the sole for the reception of cement, and reducing the thickness of the sole margins at the shank, as is commonly done by the so-called shank reducing operation.

As in prior machines of this type, a sole is presented to the tool in the present machine on a jack which is moved relatively to the tool to cause the margin of the sole to be progressively presented to the tool. The position of the cut made by the tool upon the sole is determined by a pattern against which the tool head is constantly held throughout the movement of the jack.

In the machine of my prior patent referred to above, a cam associated with the jack cooperates with mechanism on the tool head, in response to the feeding movement of the work, to lower the shank reducing cutter of the tool, below the field of action of the beveling and roughing cutter, throughout the length of the shank at each side thereof where the shank reducing operation is to be effected. It is desired that the limits of the shank reducing cuts be defined as sharply as possible, particularly at their forward extremities.

In view of the foregoing, one object of the present invention is to provide mechanism for lowering and raising the shank reducing cutter into and out of its operative position, respectively, with greater speed and certainty than was possible heretofore. To this end, and in accordance with a feature of the invention, cam operated control mechanism, similar to that which heretofore has been utilized to move the shank reducing cutter into and out of its operative position, is employed to actuate a powerful and quick acting fluid-operated means for moving the shank reducing cutter into and out of its operative position.

A further feature of the invention resides in an improved mounting for the three cutters of the tool which permits each of the cutters to be adjusted along a common axis, in order to bring it into the desired relation to the work and pattern, without varying the relation of either of the other cutters with respect to the work or pattern.

A further object of the invention is to improve the operation of the tool head in respect to both its pattern-following action when a sole is being operated upon, and also its movement into and out of operative relation to the pattern at the beginning and end, respectively, of each operating cycle of the machine.

From the first standpoint, provision is made in the illustrative machine, in accordance with a further feature of the invention, for exerting a uniform pressure upon the tool head to hold it against the pattern throughout the pattern-following motion of the tool head. Such control of the tool, in the illustrated machine, is obtained by the use of fluid-operated mechanism which permits the tool head to move to and fro, in response to the movement of the pattern, against a constant resistance which is no greater than is necessary to insure the continuous engagement of the tool head and pattern.

A much smaller force than this is adequate and desirable to move the tool head from its inoperative position gently into engagement with the pattern, and later to return the tool head to its inoperative position at the end of an operating cycle, and such reduced operating pressure for the tool head is obtained by the provision, in accordance with another feature of the invention, of means for throttling the flow of fluid at these times. However, the use of the above-mentioned throttling action is limited to the periods stated by means, under the control of the jack, for bypassing the throttling means throughout the period during which the jack is in motion.

These and other features of the invention will appear more fully from the following detailed description, when read in connection with the accompanying drawings, and will be pointed out in the appended claims.

In the drawings,

Fig. 3 is a rear elevation of the tool head;

Fig. 4 is a plan view of the tool head;

Figs. 5, 6, 7, 8 and 9 are sectional elevations of the tool head, the sections being taken along the lines V—V, VI—VI, VII—VII, VIII—VIII and IX—IX of Fig. 4;

Fig. 10 is a sectional elevation of the means for holding the cutters assembled upon the tool head;

Fig. 11 is a side elevation of the jack and the jack carrier;

Fig. 12 is a plan view of a part of the jack;

Fig. 13 is a front elevation of the base of the machine, a portion of its front having been broken away to expose the operating mechanism;

Fig. 17 is an elevation of the starting and controlling mechanism as viewed from the right-hand side of the machine;

Fig. 18 is a plan view of the structure shown in Fig. 17;

Fig. 19 is an elevation like Fig. 17 showing the starting lever and its mounting;

Figure 1:
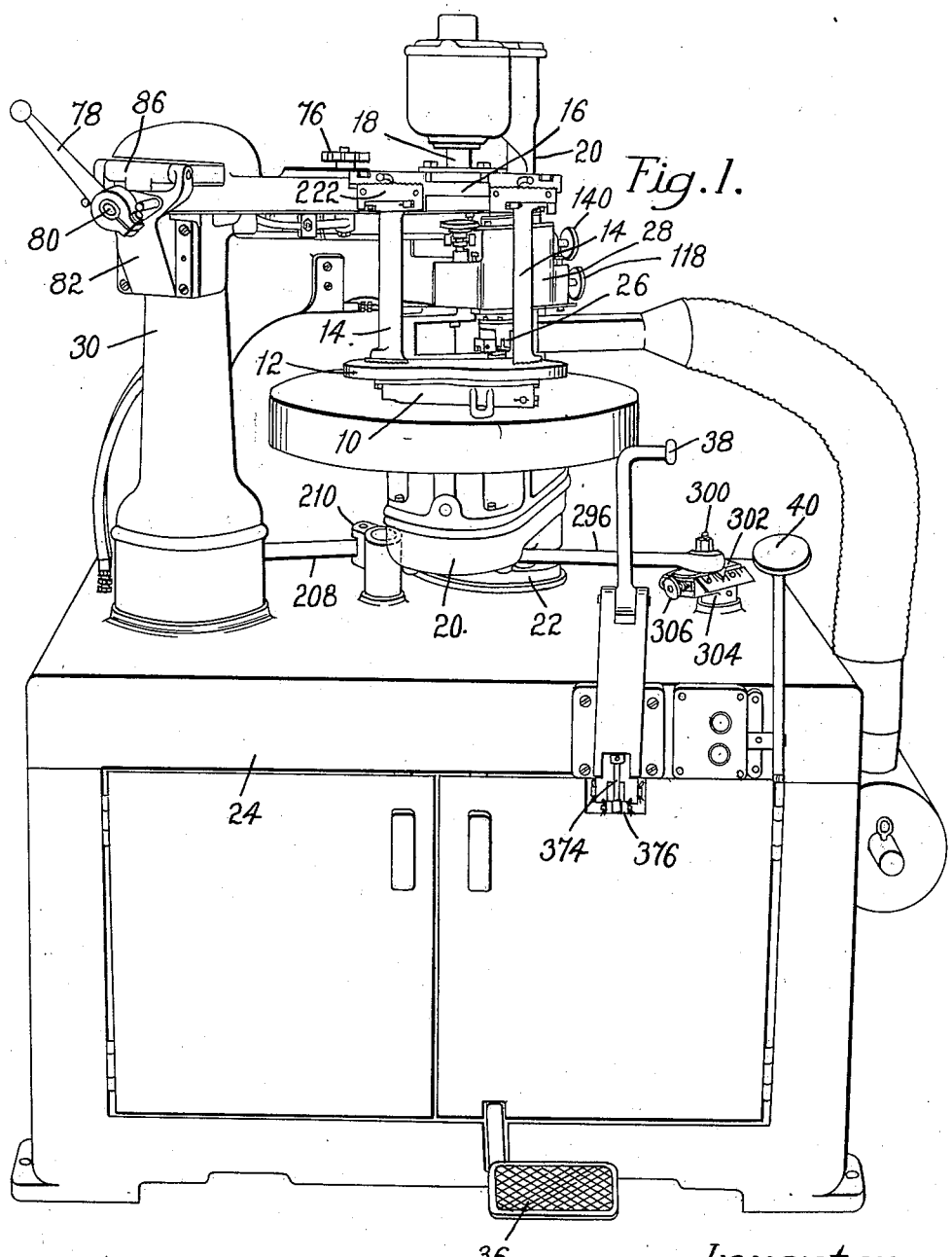
Fig. 1 is a perspective view of an illustrative machine embodying the invention.

A sole blank to be operated upon is held in a jack comprising a pattern holder 10 (Figs. 1 and 11) adapted to support a pattern 12 against which a sole blank S is clamped by a pair of presser feet 14, 14, the latter being adjustably mounted upon a cross-arm 16. This cross-arm is fixed to a shaft 18 which rotates and slides axially within the upper arm of a U-shaped carrier 20 for the jack. The jack carrier is mounted to swing about a vertical axis in a bearing 22 which is fixed to the frame 24 of the machine. By connections to be described in detail later, the jack, during one operating cycle of the machine, is rotated through one revolution with respect to the carrier 20; and, during the same period, the carrier is swung through two complete oscillations, each consisting of a movement of the carrier to the right from its position as illustrated in Fig. 1, and a return movement back aagin to its original position. As a result of these movements of the jack, one commplete transfer of the point of operation of a rotary tool 26 is made about the periphery of the sole, this tool being constructed and arranged simultaneously to trim the sole to the contour of the pattern, to bevel and rough the entire margin of the upper side of the sole, and to perform a shank reducing operation upon it.

Figure 2:
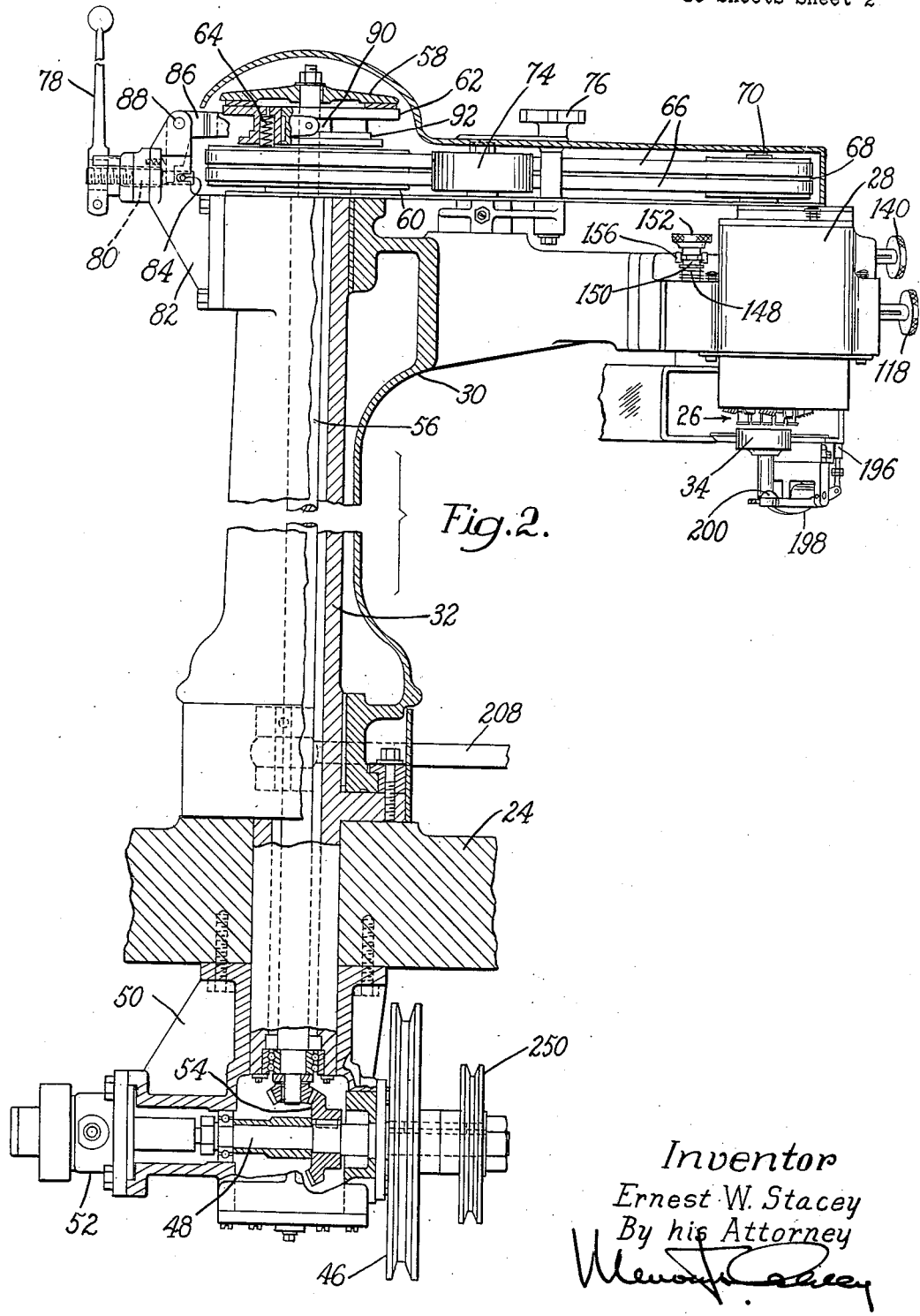
Fig. 2 is a sectional front elevation illustrating the tool carrier, the tool head, and the tool driving mechanism.

The tool is mounted in a tool head 28 (Figs. 1 and 2) fixed upon the free end of a tool carrier 30 which is mounted to swing about a vertical axis upon a hollow bearing 32 fixed to the frame 24. By fluid-operating means, to be described in detail later, the tool carrier is swung to move the tool head into and out of operative relation with respect to the jack, as well as to hold the cutter in its operative position, as determined by the engagement of a guide shoe 34, adjustably mounted upon the tool head 28, with the edge of the pattern 12. As the jack rotates, the carrier 30 swings forwardly and rearwardly of the machine in accordance with the pattern following movement of the guide shoe which remains continuously in engagement with the pattern throughout the traversing of the sole edge by the tool.

Upon depressing a treadle 36 the presser feet 14, 14 are raised above the pattern, permitting the sole blank S to be located properly thereon, and when the treadle is released the presser feet apply a preliminary yielding clamping pressure to the sole. Assuming that the machine has been prepared for operation, a cycle of its operation is started by pulling forwardly a starting lever 38 which actuates the fluid-operated mechanism for bringing the tool into its operative position, with the guide shoe 34 engaging the pattern, and applying final clamping pressure to the sole. Upon the arrival of the tool in its operative position, driving mechanism for the jack is engaged, causing the pattern and sole to be swung and rotated in the manner described above. Finally, at the end of the movement of the jack, the clamping pressure is automatically released and the tool carrier is swung rearwardly to return the tool head to its original inoperative position. If it is desired to stop the operation of the tool upon the sole at any time, the operator, by swinging a safety lever 40 rearwardly of the machine, actuates mechanism, to be described in detail later, for causing the tool carrier 30 immediately to swing the tool away from the sole and into its inoperative position. The jack completes its cycle of operation, and then comes to rest automatically. Having outlined the principal features and operating characteristics of the machine, its mechanism will now be described in detail.

Figure 14:
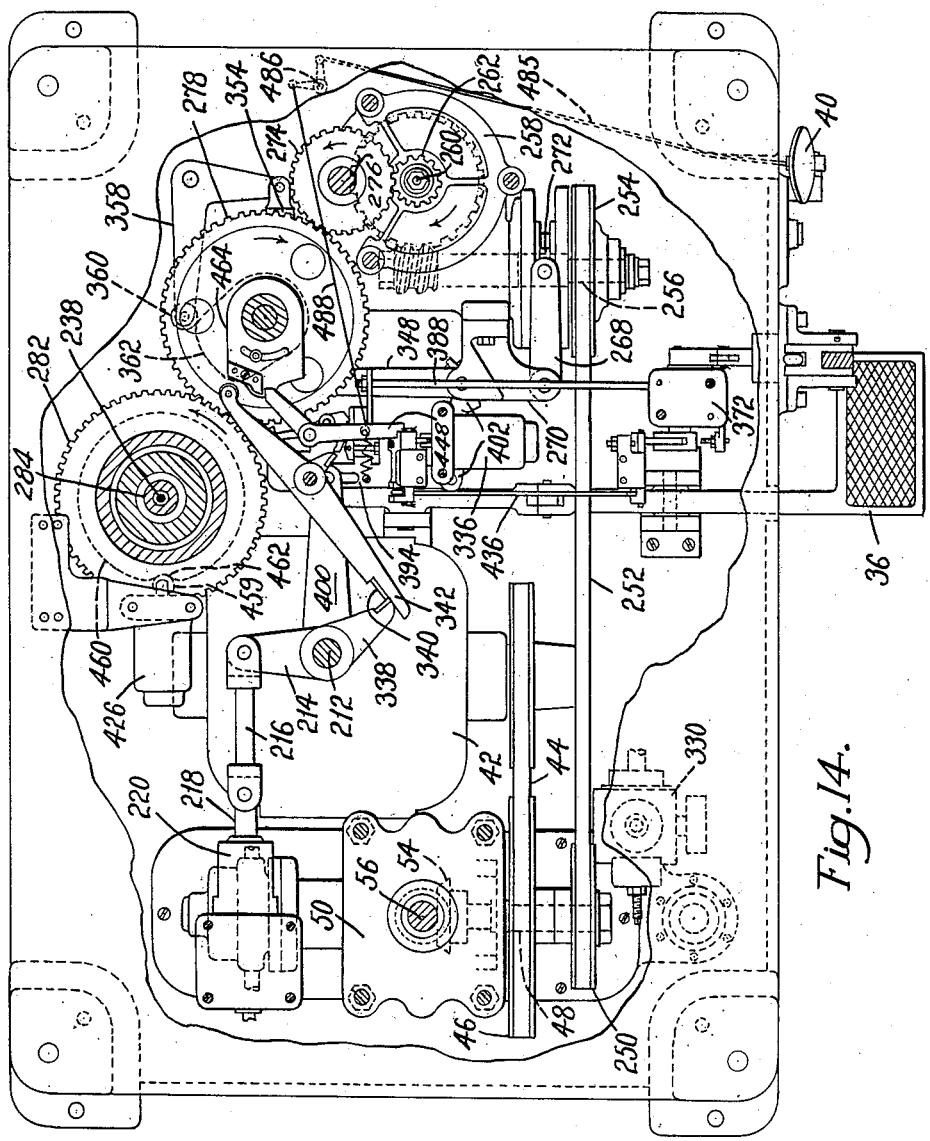
Fig. 14 is a plan view of the structure shown in Fig. 13, the top of the frame having been broken away to expose the operating mechanism.

A motor 42 (Figs. 13 and 14) drives, by means of a belt 44, a pulley 46 which is keyed to a drive shaft 48, the latter being rotatably mounted in an angular bearing 50 (Fig. 2) which is attached to the frame in alinement with the above-mentioned bearing 32 for the tool carrier 30. A pump 52, fixed to the bearing 50, is connected to the rear end of the shaft 48, and provides a source of fluid pressure for all the fluid-operated mechanism of the machine. Gearing 54 connects the drive shaft 48 with another shaft 56 which is mounted on ball bearings within the bearing 32, and carries at its upper end a friction disk 58. Mounted to rotate freely upon the upper end of the shaft 56 is a pulley 60 to which is splined a grooved flange 62. Normally, this flange is held in frictional driving engagement with the disk 58 by a number of springs 64, which are housed in holes in the flange and are compressed between the flange and the pulley. A pair of belts 66 connect the pulley 60 with another pulley 68 which is fixed to the upper end of a shaft 70 (Fig. 9) rotatably mounted in the tool head 28, and carrying at its lower end a gear 72. An idler pulley 74 (Fig. 2) is mounted for adjustment upon the carrier 30, transversely of the belts 66, in order to tighten them, and is held in position by a clamp screw 76.

The drive for the tool can be interrupted without stopping the motor 42 by swinging, in a clockwise direction (Fig. 1), a lever 78 which is threaded upon a shaft 80 mounted to slide, without rotating, within a bracket 82 (Fig. 2) which is fixed to the tool carrier 30. This shaft has fixed upon its inner end a cross pin 84 which is received in slots in the bracket 82, and is adapted to engage a depending arm of a bell crank 86 which is mounted to swing upon the bracket 82 at 88. The upper arm of this bell crank is bifurcated, partially encircles the flange 62, and carries a pair of trunnion blocks 90 which are received in the groove in the flange, and are adapted to bear against a shoulder 92 on the flange adjacent to the pulley 60. It will now be evident that when the lever 78 is swung clockwise from its position as illustrated in Fig. 1, the bell crank 86 will be swung so as to disengage the flange 62 from the friction disk 58, where-upon, the pulley 60 will no longer be driven until the lever 78 is returned to its original position.

The tool comprises a trimming cutter 94 (Fig. 9), a beveling and roughing cutter 96, and a shank-reducing and roughing cutter 98, these cutters being coaxially mounted, and provided with blades of the same shape and arrangement as in the similar cutters disclosed in my above-mentioned prior patent. However, each cutter of the present machine is capable of being adjusted independently of the others along their common axis. The shank-reducing cutter 98 is detachably mounted by bayonet type of connections upon a sleeve 100 which is rotatably mounted upon ball bearings within a casing 102 arranged to slide vertically in a bore in the tool head 28, so as to permit the shank-reducing cutter to be moved toward and away from the work. An elongated gear 104 is clamped to the sleeve 100 and meshes with the above-mentioned gear 72 throughout the range of adjustment of the shank-reducing cutter. In telescoping relation with the sleeve 100, and splined thereto at 106, is another sleeve 108 having hinged upon its lower ends a series of hooks 110 (Fig. 10) which are arranged to hold the hub of the beveling and roughing cutter 96 assembled upon the sleeve 108. A spring loaded collar 112 urges the hooks outwardly toward their operative positions, but permits them to be retracted from the cutter hub for purposes of removing the cutter from the machine. A series of lugs 114 (Fig. 10) on the sleeve 108 fit within complemental recesses in the hub of the cutter 96 to provide a driving connection between the sleeve and the cutter.

The sleeve 108 is supported and positioned heightwise of the tool head by connections comprising a slide 116 (Fig. 5), which is connected by a ball bearing to the upper end of the sleeve, and an adjusting screw 118 which is threaded into the tool head. A spring 120 compressed in a hole in the lower end of the slide 116 urges the latter upwardly, with a force sufficient to overcome the weight of the cutter 96, sleeve 108, and slide 116, to hold an inclined surface 122 on the slide against the end of the above-mentioned screw 118. Hence, when the screw is turned, the slide 116 raises or lowers the cutter 96, as desired, without affecting the positions of the other cutters.

In telescoping relation with the sleeve 108 (Figs. 9 and 10), and splined thereto by the hooks 110, is a shaft 126 upon the lower end of which the trimming cutter 94 is held by a pair of hooks 128. These hooks are hinged on the shaft 126, and are yieldingly held in their operative positions by a spring-loaded plunger 130, mounted to slide in the shaft axially thereof. In order to remove the trimming cutter from the shaft 126, the operator elevates the plunger 130 so as to cause a cross pin 132 on the plunger to move between the inner ends of the hooks, whereby they are retracted within the shaft 126. The trimming cutter 94 is supported and adjusted heightwise of the tool by connections comprising a slide 134 (Fig. 6), mounted to move vertically within the tool head, and carrying a ball bearing upon which the upper end of the shaft 126 is also mounted. A spring 136, compressed within a hole in the lower end of the slide 134, urges the latter upwardly with a force sufficient to overcome the weight of the shaft 126 and trimming cutter 94, and holds an inclined shoulder 138 on the slide in engagement with the end of an adjusting screw 140 which is threaded into the tool head. It will now be evident that by turning the screw 140, the trimming cutter can be raised or lowered at will, with respect to the other cutters, and independently thereof.

The trimming cutter is normally adjusted so that lips 142 upon the lower ends of its teeth slightly chamfer the edge of the sole at its lower side which rests upon the pattern. Similarly, the beveling and roughing cutter 96 is adjusted heightwise, to obtain the desired width of sole edge, by adjusting the screw 118. Once these cutters have been adjusted, their positions in the tool head remain the same, throughout the operation of the machine, until their readjustment may be required by a different kind of work. However, twice during each operating cycle of the machine, when the shank of the sole is presented to the tool, the shank-reducing cutter 98 is abruptly lowered below the level at which the beveling and roughing cutter 96 operates; but while the fore and heel parts of the sole are being beveled and roughened by the cutter 96, the shank-reducing cutter 98 is held above the sole. Such positioning of the shank-reducing cutter 98 is effected by a cam-controlled and fluid-operated mechanism which will now be described in detail.

The above-mentioned casing 102 (Figs. 8 and 9) within which the sleeve 100 for supporting the shank-reducing cutter is rotatably mounted, is supported vertically within the tool head 28 by an arm 144 which is fixed to a slide 146 mounted to reciprocate vertically in the tool head 28. The slide is urged upwardly by a spring 148 which is compressed between the tool head and a washer 150 arranged to seat upon an adjusting nut 152 which is threaded upon the slide 146. A groove in this nut receives a pair of pins 154 which are fixed to the forward bifurcated end of a lever 156, and the lever is mounted to swing about a horizontal axis at 158 (Fig. 4) on the tool head 28. Upward movement of the slide 146 may be limited by an adjustable stop screw 160, which is threaded into the lever 156 and is adapted to engage the upper side of the tool head. A pair of pins 162, fixed in the bifurcated rear arm of the lever 156, are received by a grooved collar 164 (Figs. 4 and 7) which is fixed to the upper end of a piston rod 166. On the lower end of the rod there is a piston 168 arranged to slide within a cylinder 170 formed vertically in a block 172 which is fixed to the tool head. Provision is made for applying fluid under pressure to the bottom of the piston 168 which, overcoming the compression of a spring 174, abruptly moves to its upper position, as determined by the seating upon the bottom of a recess in the piston 168 of a cross pin 176 fixed to the block 172. It will now be evident that, with the piston held firmly in its elevated position, the operative position of the shank-reducing cutter 98 can be adjusted by turning the above-mentioned adjusting nut 152, according to the desired depth of the shank reducing cut. It is further noted that this adjustment and movement of the shank-reducing cutter is effected independently of the other cutters, and without disturbing their adjustment with respect to each other or to the work.

Fluid pressure is supplied to the piston 168 under the control of a valve 178 arranged to reciprocate within a vertical chamber 180 formed in the block 172. Fluid under pressure is delivered from the pump 52 through a duct 182 into the chamber 180, from which ports 184, 186 lead into the upper and lower ends of the cylinder 170, respectively. The valve 178 is normally held in its upper position (Fig. 7), with its upper end abutting a cover 188 fixed to the upper side of the block 172, by a spring 190 which is compressed between the valve and another cover 192 fixed to the lower side of the block. With the valve in this position, fluid pressure is admitted to the upper end of the piston 168 which is small in effective area, and hence is urged downwardly under a relatively light fluid pressure, as well as by the spring 174. The shank-reducing cutter is now held in its elevated, inoperative position. However, if the valve is lowered so as to connect the port 186 and duct 182, fluid pressure is applied against the lower end of the piston causing it to be lifted quickly through its entire stroke, whereby the shank-reducing cutter is abruptly lowered into its operative position. The valve 178 is thus operated once at each side of the sole, when the shank portion arrives at the field of action of the tool, by mechanism next to be described.

A lever 194 (Fig. 3), which is fulcrumed upon the cover 192, is connected at one end by pin-and-slot connections to the valve 178, and is also pivotally connected at its other end to an adjustable link 196. The lower end of this link is pivoted upon another lever 198 which is fulcrumed upon the lower side of the tool head, and has formed upon its forward end a dome 200 arranged to engage a pair of cams 202 which are constructed and mounted upon the pattern holder 10 in the manner fully described in my above-mentioned prior patent. As a boundary of the shank portion of the sole at either side approaches the point of operation of the tool, the dome 200 is engaged by the beveled margin of the cam 202 at the side of the sole being operated upon, and is lowered. Through the lever 198, link 196, and lever 194, the valve 178 is now lowered, causing the piston 168 to rise to its upper position, and the shank-reducing cutter 98 to be lowered, below the level of the cutter 96, to its operative position. Similarly, when the shank-reducing cut is to be terminated, the cam 202 moves off the dome 200, and the valve 178 is returned to its initial position by the spring 190, whereby fluid is permitted to be exhausted through the port 186, and thence out of the block 172 through exhaust ports 203 and a common duct 204 which leads into a sump 206 formed in the bottom of the frame 24. The spring 174, and the fluid pressure exerted upon the upper side of the piston 166 now return the piston to its lower position, causing the shank-reducing cutter to be elevated into its inoperative position out of engagement with the sole.

When the starting lever 38 (Fig. 1) is pulled forwardly, fluid-operated mechanism swings the tool carrier 30 under a light force to bring the guide shoe 34 gently into engagement with the pattern 12. Thereafter, this mechanism causes an increased but constant force to be applied to the carrier until a complete traverse of the work past the tool has been made, and then the tool carrier is returned under the lighter force to its original position. This mechanism comprises a link 208 (Figs. 1 and 13) which connects the tool carrier with a crank 210 which is fixed upon the upper end of a shaft 212, the latter being rotatably mounted in the frame 24, and having fixed upon its lower end an arm 214. This arm is connected by a rod 216 to a piston 218 which is mounted to reciprocate in a cylinder 220 to which variable fluid pressure is supplied by control mechanism, to be described later, in order to cause the tool carrier to be operated under either the light or the full pressure conditions referred to above.

The presser feet 14, 14 are adapted to be swung between either of two positions (for right and left soles, as is fully disclosed in my prior Patent No. 2,498,771), upon slides 222 (Fig. 11) which are mounted for adjustment along the cross-arm 16, according to the size of the pattern being used. The slides are held in adjusted position upon the cross-arm by latches 224 which are pivoted on the cross-arm and are adapted to engage notched plates on the slides. It will be understood that the same pattern 12 is used whether a right or left sole is to be operated upon. When a change from one type of sole to the other is required, the pattern is inverted upside down on the holder 10, and the presser feet 14 are swung upon their slides 222.

Figure 16:
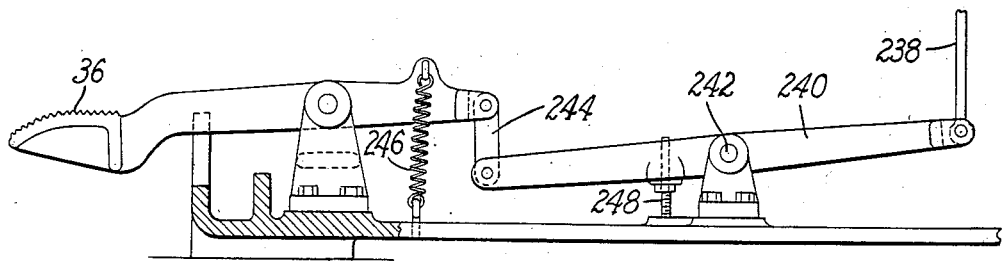
Fig. 16 is a fragmentary side elevation of the treadle mechanism for operating the work clamping means.

The presser feet are operated to exert a light preliminary clamping pressure against a sole on the pattern by the following mechanism. A grooved collar 226 fixed upon the shaft 18 receives the forward forked end of a lever 228 which is fulcrumed at 230 upon the jack carrier 20. Near its rear end this lever is engaged by a piston 232 which is urged upwardly by a spring 234. The spring is compressed between the piston and the bottom of a cylinder 236 which is fixed to the jack carrier and receives the piston 232. The above-described connections, powered by the spring 234, normally cause the above-mentioned light preliminary clamping pressure to be applied by the presser feet to the work. Later, and as will be more fully described below, fluid under pressure is supplied to the cylinder 236 to cause the piston 232 to apply considerable force to the lever 228, whereby a heavy final clamping pressure is maintained upon the work through the period during which the tool operates upon it. Acting upon the lever 228, to lift the presser feet away from the pattern when the work is to be placed upon or removed from the pattern, is a link 238 which connects the rear end of the lever 228 with another lever 240 (Fig. 16) which is fulcrumed at 242 on the frame of the machine, and is connected by a link 244 to the rear end of the treadle 36. A spring 246, stretched between the rearward arm of the treadle and the frame, counterbalances the above-described linkage; and a stop 248, fixed to the lever 240 and arranged to engage the frame of the machine, limits the downward movement of the presser feet 14 when no sole is on the pattern.

Figure 15:
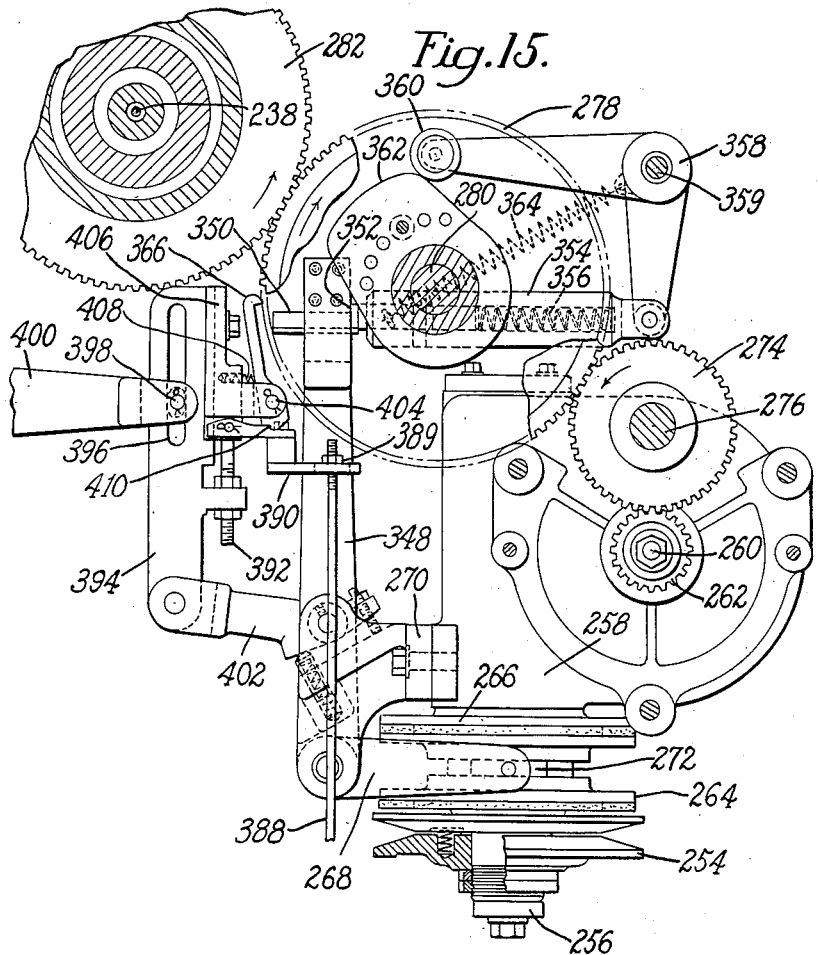
Fig. 15 is a plan view, at an enlarged scale, of a part of the jack driving mechanism shown in Fig. 14.

The jack is rotated upon the jack carrier, and the jack carrier is oscillated with respect to the frame by the following mechanism. A pulley 250 (Figs. 13 and 14) is keyed to the drive shaft 48, and is connected by a belt 252 to another pulley 254 which is mounted to rotate freely upon a horizontal input shaft 256 of a reduction gear unit 258 (Fig. 15) having a vertical output shaft 260 carrying a pinion 262 at its upper end. Power is delivered from the pulley 254 to the shaft 256 by a clutch collar 264 which is splined to the shaft and, when held against the adjacent side of the pulley 254, provides a frictional connection between these parts. When the clutch collar is moved in the opposite direction, and is held against a braking flange 266 fixed to the unit 258, rotation of the shaft 256 is quickly stopped. The clutch collar is held in engagement with either the pulley 254 or the braking flange 266 by a shifter arm 268 which is mounted to swing upon a bracket 270 fixed to the unit 258, the arm being forked and carrying trunnion blocks 272 which are freely received in a groove in the clutch collar. Mechanism for operating the shifter arm 268 will be described later.

The jack is rotated relatively to the jack carrier 20 by a gear train which is driven by the pinion 262 on the above-mentioned reduction gear unit 258. This gear train comprises a gear 274 which is fixed to a crank shaft 276 rotatably mounted in the frame 24. The gear 274 drives a gear 278 which is fixed to a control cam shaft 280, also rotatably mounted in the frame. The gear 278 meshes with another gear 282 which is fixed to the lower end of a shaft 284 mounted to rotate freely in bearings in the frame. Fixed to the upper end of the shaft 284 is a gear 288 which, through a pair of identical idler gears 290 (Fig. 11) rotatably mounted on the jack carrier, drives another gear 292 which is fixed to a shaft 294 rotatably mounted in the jack carrier. The shaft 294 is aligned with the shaft 18 (upon which the presser feet 14 are mounted), and carries upon its upper end the above-mentioned pattern holder 10. The gears 274 and 282 have a ratio of 1:2, and the gears 288 and 292 have a ratio of 1:1. Accordingly, two revolutions of the gear 274 are necessary to produce one complete revolution of the jack relatively to the carrier, and, as pointed out above, the jack makes one complete revolution with respect to the carrier during each cycle of operation of the machine.

The actual movement of the sole and the pattern relatively to the tool is the resultant of the above-described rotation of the jack upon the carrier 20 and a lateral oscillating movement which is imparted to the carrier by the following connections. The left-hand end of a link 296 (Figs. 1, 11 and 13) is pivoted, at 298, to the lower side of the carrier, and its other end is pivoted to a crank pin 300 mounted upon a slide 302 which is adjustable upon a crank 304, the latter being fixed upon the upper end of the above-mentioned crank shaft 276. By turning an adjusting screw 306, the position of the slide 302 can be varied on the crank in order to control the eccentricity of the crank pin 300, and hence the angle through which the jack carrier 20 is oscillated. It will now be evident that, in view of the 1:2 ratio between the angular velocities of the gears 274 and 292, the jack carrier will be moved through two complete oscillations (each oscillation comprising a movement from left to right, and back again), while the jack is making one complete revolution with respect to the jack carrier.

These rotative movements of the jack, about two different axes, produce one advantageous result in that the pattern is moved, when the sides of a sole are being operated upon, in a broadly curved path approximating the shape of the sides of the pattern, so that only a small pattern following movement of the tool head is required for maintaining the engagement of the guide shoe with the pattern. Moreover, as the point of operation of the tool on the sole travels around both its toe and heel ends, the resultant of the combined rotative movements of the pattern is in a path approximating the contours of the toe and heel ends of the sole, whereby only a minimum of pattern following movement of the cutter is required at these times. In addition, a further advantageous result of the motion of the jack is that a relation of normalcy between the edge of the pattern, where it is engaged by the guide shoe 34, and the direction of the pattern following movement of the tool head is approximated, whereby sudden changes in the following movements in the guide shoe, and any tendency for the guide shoe to become jammed against the pattern are avoided.

Figure 21:
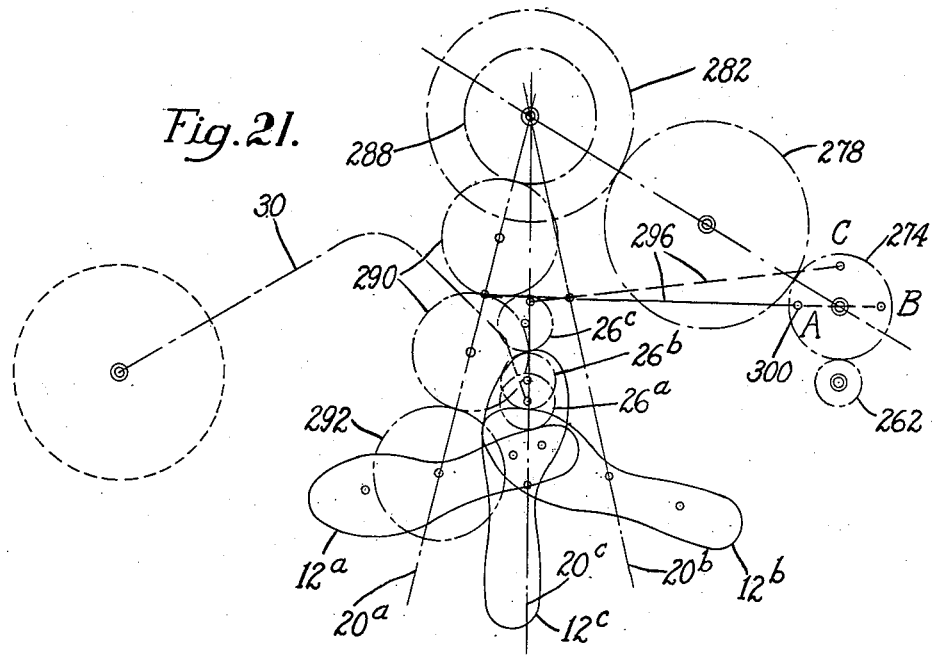
Figs. 21 and 22 are diagrammatical views illustrating the gyratory movement of the jack, and the pattern-following movement of the tool head.

The motion of the jack, and the relation between the pattern and the tool head will now be described in greater detail with reference to Figs. 21 and 22, which show the relative positions of the pattern and the tool head at successive stages of one cycle of operation of the machine. Referring now to Fig. 21, 12ᵃ designates the initial position of the pattern, corresponding to the initial position at "A," of the crank pin 300. At this time, at the start of an operating cycle of the machine, the corresponding cutter and guide shoe position 26ᵃ is near the heel breast line at the inner side of a left pattern, as illustrated. While the crank pin 300 is rotated counterclockwise through 180° to the position "B," the pattern, because it is subject to the swinging of the carrier 20 to its extreme right-hand position 20ᵇ, has a tendency to rotate counterclockwise with respect to the tool. However, the effect of the gear train, between and including the gears 274 and 292 is always to rotate the pattern clockwise with respect to the jack carrier. Because of the epicyclic relation of the gears 290 and 288, and the swinging motion of the carrier, the actual or resultant rotation of the pattern (between positions 12ᵃ and 12ᵇ) relatively to the frame or tool head is 90°, minus twice the angle through which the carrier swings. Thus, when the carrier swings from left to right, the rotation of the jack thereon is diminished, and the greater portion of the side of the sole, from the heel-breast line to about the inside tip line, is presented to the tool while the pattern is rotated through the relatively small acute angle between the pattern positions 12ᵃ and 12ᵇ. During the next 180° of rotation of the crank pin 300 to its "D" position (Fig. 22), the carrier is swung from right to left, the pattern still being rotated by the above-mentioned gear train. This reverse swinging movement of the carrier, because of the epicyclic relation of the gears 290 and 288, now causes the pattern to be rotated at an increased angular velocity through the supplement of the above-mentioned acute angle, while the point of operation of the tool upon the sole travels around its toe end.

It will be further observed that the tendency of the toe end of the sole to move to the right (from the 12ᵇ position), because of its rotation upon the carrier, is partially offset by the bodily movement of the sole to the left which is derived from the swinging movement of the carrier to the left. For these reasons, the peripheral feeding movement of the sole is moderate while its toe or heel end is being rounded even though the angular velocity of the sole is greater than when the shank is operated upon. In fact, the motion of the pattern and sole is such, when their end portions are being traversed by the tool, that the pattern and sole are rotated substantially about the centers of curvature of their end portions. For this reason, a minimum of following movement is required on the part of the tool head in order that contact shall be maintained between the guide shoe 34 and the pattern. A further result of bodily swinging the pattern in opposition to its rotative movement upon the carrier, while the ends of the sole are being operated upon, is to cause the pressure of the guide shoe upon the pattern always to be exerted in approximately the direction of the pattern following movement of the tool head. By maintaining this relation between the tool head and pattern, any tendency of a jamming action to occur between them is avoided. Positions 26ᶜ and 12ᶜ of the tool head and pattern, respectively, illustrate this relation when the toe end of the sole is operated upon, and when the crank pin 300 is in the position designated "C."

As the crank pin completes its first full revolution (at "D'" Fig. 22), the point of operation of the tool upon the sole is carried into the vicinity of the outside tip line, at which time the carrier and pattern will have been swung into their extreme left-hand positions 20ᵈ and 12ᵈ, respectively.

When the crank 300 moves through the succeeding 180° to its "E" position, the tool traverses the outside shank of the sole. As before, while the jack carrier swings from left to right, the rotation of the pattern upon the carrier is diminished, and the pattern following movement of the tool head is minimized. Next, the heel end of the sole is traversed by the tool at a moderate peripheral feeding speed in a manner similar to that in which the toe end of the sole was rounded, the return swinging movement of the carrier tending to decelerate the feeding movement as much as it is accelerated by the rotative movement of the patern upon the carrier. Moreover, the return swinging motion of the carrier causes the sole and pattern to be bodily moved to the left so that, as before, the direction of the patter following movement of the guide shoe and of its pressure against the pattern are maintained substantially normal to the contour of the pattern. This relation is again indicated, at the heel end of the pattern, by the positions of the pattern and tool head at 12ᶠ and 26ᶠ, respectively, corresponding to the position of the crank 300 at "F." Thus, during the last half of the second revolution of the crank pin 300, the point of operation of the tool upon the sole is transferred from the outside of the heel end of the sole to the inside thereof where the operation started, as indicated by the positions of the tool head and the pattern at 26ᵃ and 12ᵃ, respectively, in Fig. 21.

The presser feet 14, 14 are rotated with the pattern by the following connections, which are driven from the shaft 294 upon which the pattern holder 10 is mounted. A sprocket 308 (Fig. 11), fixed to the shaft, and another sprocket 310, mounted upon the lower end of a hollow shaft 312, are connected by a chain 314. The shaft 312 is mounted to rotate freely in the jack carrier 20, and has fixed upon its upper end another sprocket 316 which is connected by a chain 318 with a sprocket 320, the latter being splined to the shaft 18.

Figure 20:
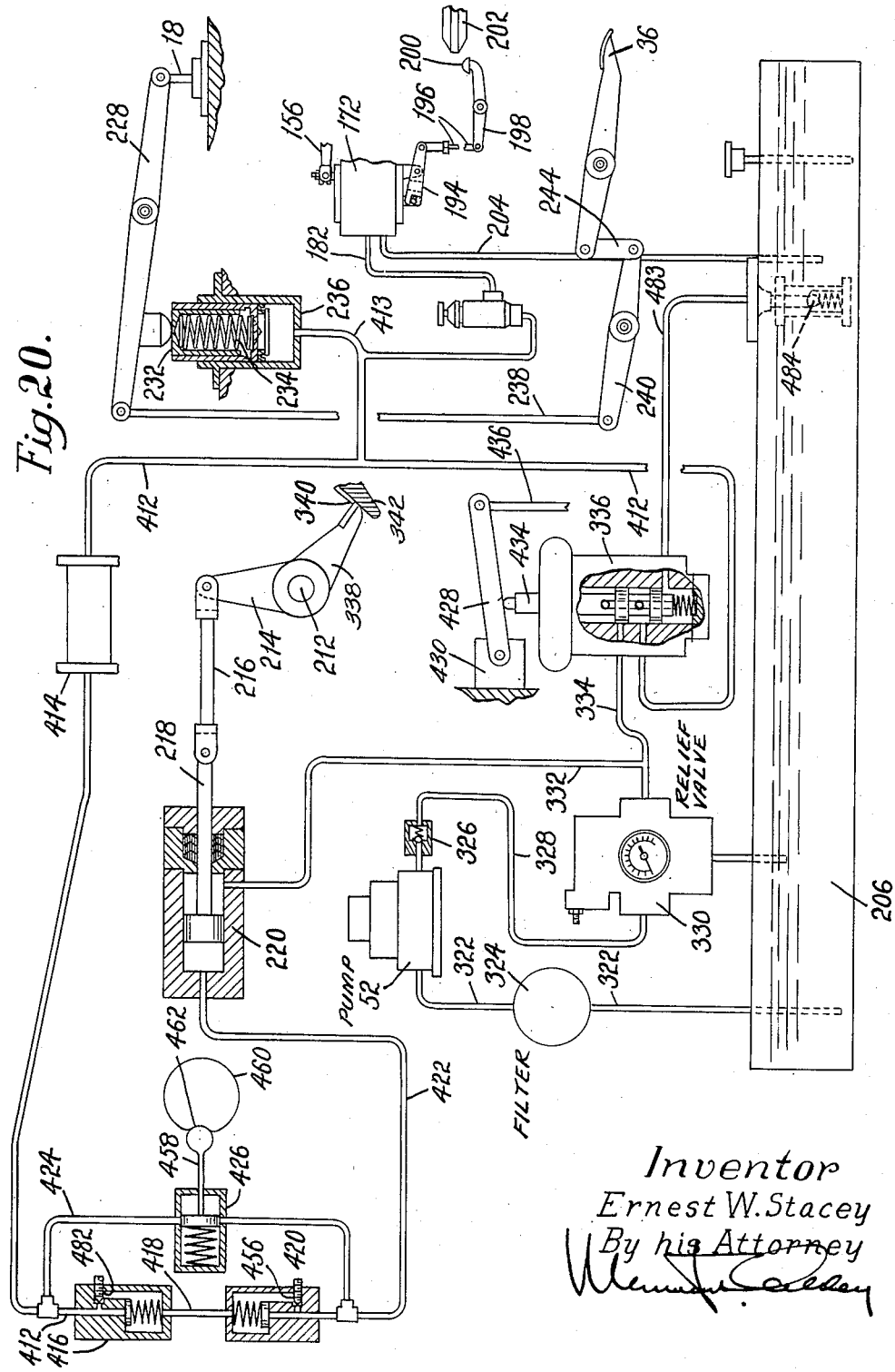
Fig. 20 is a diagrammatical view of the fluid-pressure system.

Before proceeding with a detailed description of the control mechanism, certain states of the machine, existing while it is idle, will first be described. Assuming that the motor 42 is running, the pump 52 draws fluid from the sump 206 through a pipe 322 (Fig. 13 and 20) and filter 324, and delivers the fluid through a check valve 326 and pipe 328 to a relief valve 330. This valve deliveres oil, under pressure up to 700 lbs. per square inch, through pipes 332 and 334 to the right-hand chamber of the above-mentioned cylinder 220, and a control valve 336, respectively. With the machine running idly, the control valve is in its inoperative position and passes no fluid pressure. In the cylinder 220, however, fluid pressure is exerted against the right-hand end of the piston 218, which, through the rod 216, the arm 214 and the shaft 212, holds an arm 338, which is fixed to the shaft, against a stop 340. The tool carrier 30, and hence the tool are thus held in their inoperative positions. The stop is mounted upon the left-hand end of a stop lever 342 (Fig. 18) which is pivoted at 344 to the lower side of the frame to swing about a vertical axis, and is urged in a clockwise direction by a spring 346, stretched between the left-hand arm of the lever and the frame, in order to insure the engagement of the stop 340 with the arm 338 at the end of each cycle of operation of the machine.

Considering now the drive for the jack in its idle state, the clutch collar 264 (Fig. 15) is held against the braking flange 266 by the shifter arm 268. Integral with this arm is a shifter lever 348 which at this time is forced toward the left by a spring-loaded latch 350. The latch extends through a recess in the rear end of the lever and is provided with a shoulder 352 arranged to engage the right-hand side of the lever. The latch is mounted to slide within a tube 354, between which and the latch there is compressed a spring 356 arranged to urge the latch toward the left. The tube is pivoted upon one arm of a bell crank 358 which is pivoted at 359 upon the frame, the other arm of the bell crank carrying a roll 360 arranged to run upon a cam 362 which is fixed to the shaft 280. A spring 364 stretched between the tube 354 and the bell crank 358 urges the crank in a counterclockwise direction to maintain the roll 360 in engagement with the cam 362 at all times. The spring 356 is strong enough to overcome springs (not shown), mounted internally within the clutch collar 264, for holding the latter in driving engagement with the pulley 254 when the latch 350 is operated to release the shifter lever 348, and to start a cycle of operation of the jack, as will be described below.

Let it now be assumed that a sole blank S has been placed on the pattern 12, and that the treadle 36 has been released by the operator to permit the presser feet 14, 14 to hold the work against the pattern under the preliminary pressure provided by the spring 234. This pressure is sufficient to hold the work piece in whatever position it is placed upon the pattern, and yet is not too great to prevent the operator from shifting the work piece into the desired position. It is further to be assumed that the lever 78 has been moved into its right-hand operative position to complete the drive to the tool.

To start a cycle of operation of the machine, the operator pulls the starting lever 38 forwardly which, through the connections next to be described, first releases a hook 366 (Fig. 15) which moves into operative relation to the latch 350, and then sets the control valve 336 in its operative position. The starting lever 38 operates a rockshaft 370 (Figs. 17 and 18), which is mounted to swing about a horizontal axis in a bracket 372 fixed to the frame, through a system of pivotally connected links and levers comprising an adjustable link 374, a lever 376 fulcrumed on the frame, a link 378, and a lever arm 380, the latter being fixed to the rockshaft 370. A spring 382 stretched between the frame and the link 374 tends to hold the starting lever in its inoperative position, as determined by the engagement of a stop 384 on the lever with the frame. Forward movement of the starting lever is limited by the engagement of another stop 385, on the lever 376, with the frame. Fixed to the rockshaft 370 adjacent to the arm 380 is another arm 386 to which one end of a rod 388 is connected, the other end of this rod carrying a stop nut 389 (Fig. 15) arranged to engage an arm 390 which is mounted to swing upon a stud 392. This stud is mounted upon a link 394 having an elongated slot 396 arranged to receive a swivel block 398 which is mounted in the bifurcated right-hand end of an arm 400. This arm is fixed to the above-mentioned shaft 212 of the mechanism for operating the tool carrier. The link 394, at its forward end, is pivoted to a link 402 which is mounted to swing about a vertical axis upon the above-mentioned bracket 270. Under the control of the arm 400 and link 402, the link 394 may move with a substantially parallel motion. The above-mentioned hook 366 is pivotally mounted at 404 upon a block 406 which is fixed to the link 394, and a spring 408 compressed between the hook and the block urges the hook toward the latch 350. The hook 366 is normally held retracted from the latch by the engagement of the lower end of the hook with a shoulder 410 on the above-mentioned arm 390, but after a very short forward movement of the starting lever 38 has occurred, the rod 388 retracts the arm 390 from the hook, as stated above, permitting the latter to move to its operative position with its end overlying the latch 350.

When the control valve 336 is set in its operative position, fluid pressure is directed to the cylinder 220 of the mechanism for operating the tool carrier, and to the cylinder 236 of the work-clamping mechanism, through connections comprising a pipe 412 (Fig. 20) having a branch 413 which enters the cylinder 236. Fluid under pressure in this cylinder acts upon the piston 232 to cause increased clamping pressure to be applied to the work. A sequence valve 414 in the pipe 412 is arranged to pass fluid under a pressure of 350 lbs. per square inch or more toward a check valve 416, but allows a free flow of fluid in the opposite direction. A pipe 418 connects the valve 416 with another check valve 420, and a pipe 422 leads from the valve 420 to the left-hand chamber of the cylinder 220. Another pipe 424 connects the pipes 412, 422 so as to by-pass the check valves 416, 420, the flow of fluid through the pipe 424 being under the control of a valve 426 which is operated in timed relation to the swinging movement of the jack carrier 20, as will be described later.

The control valve 336 is set in its operative position by connections comprising a lever 428 (Figs. 17, 18 and 20), which is mounted to swing about a horizontal axis on a block 430 fixed to the frame, and has a spring-loaded plunger 432 arranged to engage the stem 434 of the valve. A rod 436 is pivoted at one end to the lever 428, and at the other end is connected by a pin 437 to a U-shaped arm 438 which is mounted to swing about a horizontal axis at 440 on the frame. Pivoted upon a bifurcated arm 442 fixed to the left-hand end of the rockshaft 370 is a catch 444, having a hooked end arranged normally to overlie the pin 437, and a tail which is acted upon by a spring-loaded plunger 446, carried by the arm 442, so as yieldingly to hold the catch 444 in engagement with the pin 437. It will now be evident that when the starting lever 38 is pulled forwardly, the lever 428, through the mechanism just described, will be operated to set the control valve in its operative position. The valve is releasably held in this position by a latch 448 which is mounted to swing upon a stud 450 fixed to the frame, behind the rear side of the lever 428, under the influence of a spring 425 stretched between the latch and the frame. Toward the end of the forward movement of the arm 442, a stop 454 fixed upon the bracket 372 is engaged by the tail of the catch 444 and causes the catch to be lifted off the pin 437.

As soon as the control valve 336 is set in its operative position in the above manner, fluid under pressure enters the pipe 412 (Fig. 20) and is delivered through the pipe 413 to the cylinder 236 of the clamping mechanism, to cause an increased pressure to be applied to the work. The fluid pressure, upon building up to 350 lbs. per square inch, passes the valve 414, and also passes freely through the check valve 416, thence through the pipe 418 into the check valve 420, from which the fluid cannot flow, toward the pipe 422, except by passing through a throttle valve 456 which permits only a small flow of fluid into the pipe 422. Since the area of the left-hand end of the piston 218 is greater than that of its right-hand end, the piston will be subject to a differential pressure which will cause it to move to the right, and at a slow speed because of the action of the throttle valve 456. Through the above-described mechanical connections between the piston 218 and the tool carrier 30, the tool head will be swung forwardly of the machine at a moderate speed to bring the guide shoe 34 gently into engagement with the pattern 12. As soon as this occurs, the resistance of the pattern to further forward movement of the guide shoe causes the pressure in the fluid system to rise to the highest permissible pressure (700 lbs. per square inch), as determined by the relief valve, and from this point on, while the sole is being operated upon, the presser feet 14, 14 engage the sole, and the guide shoe 34 engages the pattern with a relatively heavy pressure.

During the first part of the forward movement of the tool carrier 30, the arm 400 moves freely in the recess 396 (Fig. 15) in the link 394. However, before the guide shoe 34 engages the pattern, the block 398 on the arm 400 becomes seated against the link at the forward end of the recess therein, and accordingly, the final movement of the arm causes the hook 366, which has already been set over the latch 350, to pull the latter forwardly, disengaging its shoulder 352 from the shifter lever 348. The clutch collar 264 is now disengaged from the braking flange 266, and is moved into driving engagement with the pulley 254 by its internal springs. Upon the release of the shifter lever 348 by the latch 350, the latter moves to the left, under the influence of the spring 356, far enough to reset the hook 366 with its lower end overlying the shoulder 410 on the arm 390.

With the drive for the jack in operation, the above-described cycle of gyrating movement of the work is begun. As soon as the rotative movement of the jack upon the carrier begins, the above-mentioned valve 426 is operated to permit the pipe 424 to by-pass the check valves 416, 420, thereby allowing an unrestricted flow of fluid into the cylinder 220 so that the following movement of the guide shoe 34, in response to the gyrating movement of the pattern, will be rapid enough to insure the continuous and firm engagement of the guide shoe with the pattern. The valve 426 (Figs. 13, 14 and 20) comprises a plunger 458 having a roll 459 mounted upon its outer end and arranged to run against a cam 460, the latter being fixed to the hub of the gear 282. This cam has one notch 462 shaped to receive the roll 459 closely. Before each cycle of operation of the jack is begun and after its completion, the roll is seated within the notch, and the valve 426 is then closed. At such times, the flow of fluid through the pipe 422 toward or from the cylinder 220 is restricted by the throttle valves 456 and 482, respectively. However, with a very slight amount of rotation of the jack, the valve 426 is opened, permitting an unrestricted flow of fluid toward and from the cylinder 220 through the pipe 424.

Soon after the drive for the jack is engaged, the above-mentioned stop lever 342 (Fig. 18) is moved out of the path of movement of the arm 338 by a cam 464 which is fixed to the gear 278 and engages a roll 466 on the right-hand end of the stop lever. Once it is moved to this inoperative position, the stop lever is latched there, until near the end of the cycle, by a latch 468 one end of which is hooked so as to overlie an arm 470 which is integral with the stop lever. A spring 472 stretched between the latch and the frame holds the latch in engagement with the arm 470. The latch is mounted to swing upon the above-mentioned stud 450, and has a tail 474 which is engaged by the cam 464 just before it reaches the end of each revolution. Thus, when the stop lever 342 is released, it is swung into engagement with the end of the arm 338 by the spring 346.

Just before the end of each operating cycle is reached, a cam finger 476 fixed to the cam 464 engages a tail 478 on the latch 448, swinging the latter out of engagement with the lever 428, whereby the valve stem 434 is released and the valve 336 is returned to its inoperative setting. Just prior to this time, a rising slope on the cam 362 (Fig. 15) causes the bell crank 358 to move the tube 354 to the left, and when the stress in the spring 356 overcomes the pressure of the clutch collar 264 against the pulley 254, the drive for the jack is disengaged, and a slight further movement of the cam 362 occurring just before the cycle is completed causes the clutch collar to be forced against the braking flange 266, and the jack-driving means to be quickly stopped.

When the control valve 336 is returned to its inoperative setting, as described above, it prevents the admission of fluid into the pipe 412. Thus, fluid pressure is cut off from the cylinder 236 of the clamping mechanism, and also from the left-hand end of the cylinder 220 of the mechanism for operating the tool carrier. However, fluid pressure continues to be supplied through the pipe 332 to the right-hand end of the cylinder 220, and this pressure provides the power for moving the tool carrier away from the work and back to its original inoperative position. This movement of the tool carrier is effected by a light force and at a moderate rate because the flow of fluid away from the left-hand end of the cylinder 220, although it may pass freely through the check valve 420, is restricted by a throttle valve 482 associated with the check valve 416. At this time, fluid is prevented from passing through the by-pass pipe 424, for the reason that the valve 426 was closed when the drive for the jack was stopped. Thus, under the control of the throttle valve 482, the tool carrier is now swung rearwardly of the machine in response to fluid pressure applied to the right-hand end of the piston 218 in the cylinder 220, such movement of the carrier being terminated by the engagement of the arm 338 with the stop 340 on the stop lever 342. During such rearward movement of the tool carrier, fluid is freely exhausted into the sump 206 through the pipe 412, the control valve 336, and another pipe 483 which leads from the control valve into the sump. A check valve 484 at the end of the pipe 483, is adapted to prevent fluid from being drained from the pipe 412, after the piston stops moving to the left, but without materially resisting the flow of fluid into the sump.

The machine now having been operated through a complete cycle, the operator may depress the treadle 36 to lift the presser feet 14 off the work, and remove the completed workpiece from the pattern.

If it is desired to stop the cutting action of the tool at any time, the operator presses upon the safety lever 40 (Figs. 1 and 14) which, through connections comprising a link 485 connecting the lever with a bell crank 486 pivoted upon the frame, and a link 488 connecting the bell crank with the latch 448 (Fig. 18), causes the latch to be withdrawn from the lever 428. In this event, the valve 336 immediately returns to its inoperative setting, and at once the jack carrier will be moved rearwardly to separate the tool from the work, and to return the tool to its inoperative position, in the manner described above.

The operation and use of the machine will now be summarized. On depressing the treadle 36, the presser feet 14, 14 are raised to permit a sole blank to be placed upon the pattern, and when the treadle is released the sole is clamped against the pattern with a light preliminary pressure under the influence of the spring 234. The trimming cutter 94 is adjusted heightwise of the tool head, by turning the screw 140, so that the edge of the sole will be chamfered at its lower side when the sole is trimmed. Similarly, by turning the screw 118, the height of the beveling and roughing cutter 96 is adjusted so as to bring the sole edge to the desired width. It is also assumed that the desired adjustment of the shank reducing cutter 98, effected by turning the nut 152, will have been made.

At the beginning of an operating cycle of the machine, the jack carrier 20 is in its extreme left-hand position, and the toe end of the pattern on the jack is directed toward the jack the left. The tool carrier 30 is in its rearward (inoperative) position, and the tool head 28 is retracted from the jack and located in its inoperative position by the engagement of the arm 338 with the stop lever 342.

Assuming that the drive for the tool 26 has been engaged by swinging the lever 78 to the left, and that the motor 42 is running, an operating cycle is started by pulling the starting lever 38 forwardly. The immediate effects of such operation of the lever are to release the hook 366, which now becomes engaged with the latch 350, and to move the stem 434 of the control valve 336 into its operative setting. Fluid pressure is now applied against the piston 232 which causes the sole to be rigidly clamped upon the pattern, and simultaneously, fluid pressure is also applied against the left-hand end of the piston 218, which causes the tool carrier and tool head to be swung toward the pattern. Because the jack has not yet been moved, the valve 426 is closed and prevents any flow of fluid through the by-pass pipe 424. Although fluid now flows freely toward the piston 218 through the valve 416, its flow through the valve 420 in this direction is restricted by the throttle valve 456. Accordingly, the movement of the tool head toward the pattern occurs at a moderate rate, and the guide shoe 34 is brought gently into engagement with the pattern, in the vicinity of the heel breast line. Toward the end of the movement of the tool head toward the pattern, the dome 200 on the lever 198 runs across the margin of the cam 202 (as indicated by the broken line in Fig. 12), as a result of which the valve 178 is set so as to cause the shank reducing cutter 98 to be lowered into its operative position by the time when the guide shoe 34 engages the edge of the pattern. As the pattern now offers resistance to further forward movement of the tool head, the pressure in the fluid system builds up immediately to an amount determined by the setting of the valve 330 (about 700 lbs. per square inch), and both the work and the guide shoe 34 are now more firmly held against the pattern.

During the movement of the tool head toward the pattern, the swivel block 398 on the arm 400 first moves freely within the slot 396 in the link 394 without moving it. However, shortly before the guide shoe engages the pattern, the swivel block becomes seated in the forward end of the recess and the link 394 is now moved forwardly, causing the hook 366 to pull the latch 350 forwardly far enough to disengage its shoulder 352 from the shifter lever 348. The shifter lever now swings to the right as the clutch collar 264, under the impulse of its internal springs, moves into driving engagement with the pulley 254. In the above manner, the operation of the driving means for the jack is started.

Immediately upon the removal of the shoulder 352 from engagement with the shifter lever 348, the latch 350 slides freely to the left under the pressure of the spring 356, carrying with it the hook 366, the lower end of which becomes reengaged with the shoulder 410 on the arm 390. Shortly after the drive for the jack has been started a falling slope on the cam 362 is presented to the roll 360, permitting the tube 354, containing the latch 350, to be drawn to the right by the spring 364. The latch 350 is thus moved far enough to the right of the shifter lever 348 to permit the shoulder 352 to reengage the lever, near the end of the operating cycle, when the rising slope on the cam 362 acts upon the roll 360.

As soon as the least rotative movement of the jack occurs, the cam 460, associated with the gear 282, opens the valve 426 rendering the pipe 424 operative to by-pass the check valves 416 and 420. From this time on, until a cycle of movement of the jack has been completed, an unrestricted flow of fluid under full pressure may occur, either into or out of the cylinder 220, insuring continuous engagement of the guide shoe 34 with the pattern under a constant pressure from the fluid-pressure system regardless of the position of the tool head in the path of its pattern-following movement.

Now that the movement of the jack has been started, the margin of the sole is progressively presented to the cutting action of the tool as a result of a gyratory movement of the jack which is the resultant of its rotary movement with respect to the jack carrier, and the swinging movement of the latter. As the jack carrier swings away from its 20ª position (Fig. 21) toward the right, to cause the point of operation of the tool to be carried forwardly along the inside shank to the toe portion of the sole, as indicated by the 12ᵇ position of the jack, the rotative movement of the jack on the carrier is decelerated. When the operating point of the tool passes the junction of the shank and forepart portions of the sole, the cam 202 is moved off the dome 200, and the shank reducing cutter 98 is quickly lifted above the upper surface of the sole, whereby the shank reducing cut is abruptly stopped. As the operating point of the tool is transferred around the toe end of the sole, the jack carrier is swung from its extreme right-hand position 20ᵇ to its extreme left-hand position 20ᵈ, this swinging movement of the jack carrier causing the rotative movement of the jack upon the carrier to be accelerated to the same extent that it was decelerated during the previous swinging movement of the carrier in the other direction. It will be noted that, particularly with reference to position 12ᶜ of the pattern in Fig. 21, when the operating point of the tool passes the extreme toe end of the sole, movement of the toe end of the sole to the right because of its rotation on the jack carrier is partially offset by the swinging movement of the sole to the left which is derived from the motion of the jack carrier at this time. The resultant motion of the sole insures a free running action between the guide shoe 34 and the pattern because the direction of the edge of the pattern where it is engaged by the guide shoe is maintained approximately perpendicular to the path of movement of the guide shoe at all times. Moreover, the resultant motion of the sole while its toe end is rounded is approximately one of rotation about the center of curvature of the toe portion of the sole, on account of which the peripheral feeding movement of the work is maintained at a moderate velocity even though the point of operation of the tool is now the farthest from the axis about which the jack rotates upon the carrier.

Figure 22:
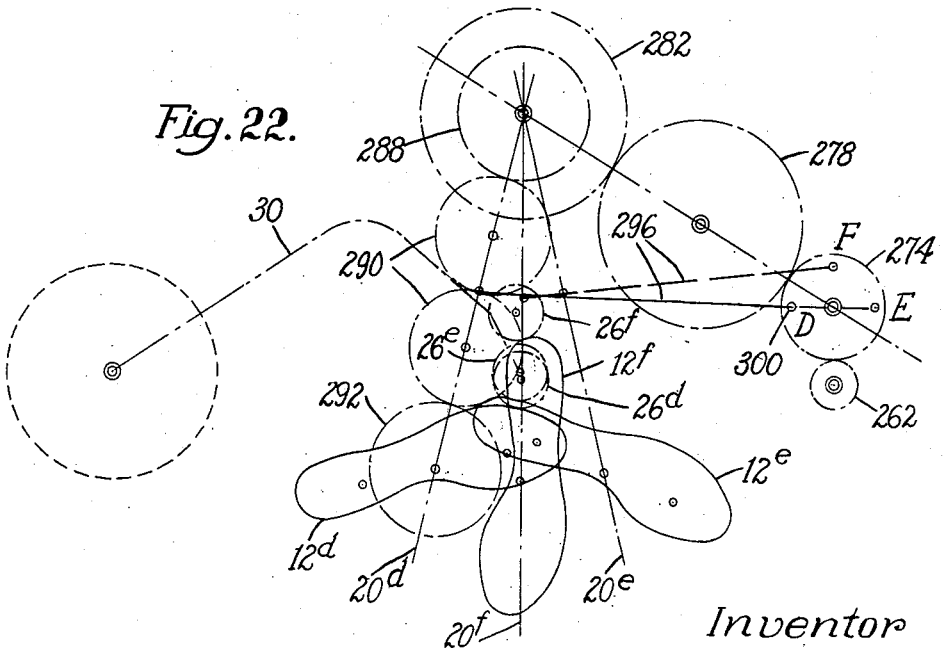

During the next swinging movement of the jack carrier to the right (from the 20ᵈ position, Fig. 22, to the 20ᵉ position), when rotative movement of the jack on the carrier is diminished as before, the operating point of the tool is transferred along the outer margin of the sole to its heel portion (26ᵉ, Fig. 22). During this period, the cam 202 moves over the dome 200 on the lever 198, as the operating point of the tool passes the junction of the forepart and shank portion of the sole, producing an abrupt shoulder there. During the remainder of the operating cycle of the machine, the jack is moved from the 12ᵉ position (Fig. 22), through the 12ᶠ position into the original 12ª position (Fig. 21). During this latter period, the rear edge of the cam 202 at one side moves off the dome 200, the other rear edge of the cam moves over it, at the rearward ends of the shank reducing cuts. Moreover, as in rounding the toe end of the sole, the jack is now moved, with a moderate peripheral feeding speed, approximately about the center of curvature of the heel portion of the sole.

Just before one revolution of the jack is completed, the cam 464 strikes the tail 474 on the latch 468, and releases the latter from the arm 470, thus allowing the stop lever 342 to swing into engagement with the end of the arm 338. Thus, the stop 340 is brought into the path of the arm 338, in readiness to hold the arm and the tool head in their inoperative positions.

The rising slope on the cam 362 now operates through the bell crank 358, the tube 354, the spring 356, and the latch 350 to swing the shifter lever 348 to the left, disengaging the clutch collar 264 from the pulley 254. Just before the jack stops, the cam finger 476 strikes the tail 478 of the latch 448, retracting it from the lever 428 which now permits the control valve 336 to resume its inoperative setting. From this time on, fluid pressure is no longer applied against the piston 232 of the clamping mechanism, and similarly, fluid pressure is no longer applied to the left-hand end of the piston 218 so as to hold the tool head against the pattern. Fluid pressure is still supplied, however, to the right-hand chamber of the cylinder 220 which causes the tool carrier to be swung rearwardly to move the tool head into its inoperative position. This movement of the tool carrier takes place at a moderate speed because, the valve 426 in the by-pass pipe 424 having been closed when the jack came to rest, fluid is discharged from the cylinder 220 in a restricted flow under the control of the throttle valve 482.

At any time after the jack stops, when the fluid pressure no longer acts upon the piston 232 of the clamping mechanism, the treadle 36 may be depressed to release the sole which has just been operated upon.

If it is desired to use the machine for operating upon right soles, after it has been operating upon left soles, or vice versa, the pattern 12 and the cam 202 are inverted and reassembled upon the pattern holder 10, and the presser feet 14 are swung on their supports 222.

Having described my invention, what I claim as new and desire to secure by Letters Patent of the United States is:

1. In a machine for operating upon soles, a rotary tool comprising a shank reducing cutter, a jack for holding a sole, said jack and tool being relatively movable to cause the point of operation of said tool on the sole to be transferred around its margin, said cutter being mounted for movement heightwise of said jack through a predetermined stroke between an inoperative position and an operative position, operator controlled means for adjusting the limits of the stroke of said cutter, fluid-operated means for moving said cutter between its said positions, said fluid-operated means being arranged normally to hold said cutter in its inoperative position, and means operated in response to the relative movement of said jack and tool for actuating said fluid-operated means to hold said cutter in its operative position when the shank of the sole is operated upon.

2. In a machine for operating upon soles, a rotary tool comprising a shank reducing cutter, a jack comprising a pattern and clamp for holding a sole, said jack being movable progressively to present the margin of the sole to the tool, a cam associated with said jack, said cutter being mounted for movement heightwise of said pattern between inoperative and operative positions, fluid-operated means for moving said cutter between said positions, said means being constructed and arranged normally to hold said cutter in its inoperative position, and means controlled by said cam for actuating said fluid-operated means while the shank portion of the sole is presented to said tool to hold said cutter in its operative position.

3. In a machine for operating upon soles, a rotary tool comprising coaxially mounted roughing and shank reducing cutters, a jack comprising a pattern and clamp for holding a sole, said jack being movable progressively to present the margin of the sole to the tool, said shank reducing cutter being movable axially thereof through a predetermined stroke between an inoperative position out of engagement with the sole and an operative position in which it makes a shank reducing cut deeper than the roughing cut, operator controlled means for varying the limits of the stroke of said shank reducing cutter, fluid-operated means for moving said shank reducing cutter between its said positions and for holding it in said positions, and means operated in response to the movement of said jack for actuating said fluid-operated means to cause said shank reducing cutter to be held in its operative position when the shank of the sole is operated upon and to be held in its inoperative position when the remainder of the sole is operated upon.

4. In a machine for operating upon soles, a rotary tool comprising coaxially mounted trimming, roughing, and shank reducing cutters, a jack comprising a pattern and clamp for holding a sole, said jack being movable progressively to present the margin of the sole to the tool, operator controlled means for adjusting each of said trimming and roughing cutters independently of the other cutters along their common axis, said shank reducing cutter being movable along said axis through a predetermined stroke between an inoperative and an operative position, fluid-operated means for moving said shank reducing cutter between said positions, and means operated in response to the movement of said jack for actuating said fluid-operated means to cause the shank reducing cutter to be held in its operative position throughout the time when the shank of the sole is operated upon and to cause said tool to be held in its inoperative position when the remainder of the sole is operated upon.

5. In a machine for operating upon soles, an operating tool, a jack, means for operating said jack to cause a sole thereon to be progressively presented to said tool, fluid-operated means for moving said tool from an inoperative position into operative relation with respect to the sole, a fluid-pressure system comprising a passage having throttle valves therein for restricting the flow of fluid toward and away from said means, a second passage for by-passing said valves, a normally closed by-pass valve in said second passage, and means operated by said jack operating means for holding said by-pass valve open throughout the operating cycle of said jack.

6. In a machine for operating upon soles, an operating tool, a jack, means for operating said jack through a cycle to cause the margin of a sole thereon to be progressively presented to said tool, said tool being movable from an inoperative position into operative relation with respect to said jack, fluid-operated means for thus moving said tool and maintaining it in operative relation to said jack, a fluid-pressure system comprising a restricted fluid passage and a by-pass therefor, a valve for normally closing said by-pass, and means for opening and closing said valve at the beginning and end, respectively, of the cycle of operation of said jack.

7. In a machine for operating upon soles, an operating tool, a jack, means for driving said jack through a cycle of operation to cause a sole thereon to be progressively presented to said tool, fluid-operated means for holding said tool in operative relation with respect to the sole and for moving said tool into and out of such relation, a fluid-pressure system comprising a restricted passage for conducting a limited flow of fluid toward and away from said fluid-operated means whereby said tool is moved under a diminished pressure into and out of operative relation with respect to the sole, a second passage for conducting fluid freely to and from said fluid-operated means, a normally closed valve for controlling the flow of fluid through said second passage, and means for holding said valve open throughout the cycle of operation of said jack whereby said tool is held with a constant and increased pressure in operative relation to the sole while it is operated upon by said tool.

8. In a machine for operating upon soles, an operating tool, a jack for holding a sole, driving means for operating said jack through a cycle to cause the margin of a sole thereon to be progressively presented to said tool, fluid-operated means for moving said tool from an inoperative position into operative relation with respect to said jack, said means also being operable to hold said tool in operative relation to said jack throughout its cycle of operation and then to return said tool to its inoperative position, a fluid-pressure system comprising a restricted passage and a by-pass therefor arranged to conduct fluid to and from said fluid-operated means, a valve for normally closing said by-pass, an operator controlled starting valve for admitting fluid to said restricted passage whereby said tool is advanced into operative relation with respect to said jack, connections operated at the end of such advancing movement of said tool for engaging said jack driving means whereby a cycle of operation of said jack is initiated, and means associated with said jack driving means for opening and closing said by-pass valve at the beginning and end, respectively, of the cycle of operation of said jack.

References Cited in the file of this patent

UNITED STATES PATENTS

| Number | Name | Date |
|---|---|---|
| 2,359,395 | Stacey | Oct. 3, 1944 |